United States Patent [19]

Hilborn et al.

[11] Patent Number: 5,232,517
[45] Date of Patent: Aug. 3, 1993

[54] MULTIPOINT THERMOCOUPLE ASSEMBLY

[76] Inventors: Howard L. Hilborn, 12127 Sherrill, Houston, Tex. 77089; Bennett J. Grieb, 2115 Manor Dr., Richmond, Tex. 77469; Herman E. Storey, 3406 Village Oaks Dr., Kingwood, Tex. 77339; Paul A. Fossey, 1922 Wagon Gap Trail, Houston, Tex. 77090; Paul S. Johnson, 219 Enchanted Trail Dr., Spring, Tex. 77388

[21] Appl. No.: 877,100
[22] Filed: May 1, 1992
[51] Int. Cl.[5] .............................. H01L 35/02
[52] U.S. Cl. ...................... 136/233; 136/211; 136/221; 136/222; 136/230; 136/231; 374/179; 374/208
[58] Field of Search ............... 136/200, 202, 211, 212, 136/221, 222, 230, 231, 233, 234, 242; 376/247; 374/179, 208

[56] References Cited

U.S. PATENT DOCUMENTS

| | | | |
|---|---|---|---|
| 2,796,455 | 6/1957 | Jones | 136/4 |
| 3,015,234 | 1/1962 | Springfield | 73/339 |
| 3,263,502 | 8/1966 | Springfield | 73/341 |
| 3,327,531 | 6/1967 | Fradeneck | 73/359 |
| 3,393,101 | 7/1968 | Kirkpatrick | 136/224 |
| 3,637,438 | 1/1972 | Springfield | 136/230 |
| 3,813,943 | 6/1974 | Fradeneck | 73/343 R |
| 3,939,012 | 2/1976 | Williams | 136/221 |
| 3,955,419 | 5/1976 | Barton et al. | 73/340 |
| 4,162,175 | 7/1979 | Salt et al. | 136/233 |
| 4,385,197 | 5/1983 | Schwagerman | 136/221 |
| 4,410,756 | 10/1983 | Schwagerman | 136/221 |
| 4,590,326 | 5/1986 | Woldy et al. | 136/233 |
| 4,653,935 | 3/1987 | Daily et al. | 374/208 |
| 4,707,148 | 11/1987 | Richmond | 374/208 |
| 4,765,947 | 8/1988 | Babin et al. | 376/347 |
| 4,848,927 | 7/1989 | Daily et al. | 374/208 |

*Primary Examiner*—Donald P. Walsh
*Assistant Examiner*—Chrisman D. Carroll
*Attorney, Agent, or Firm*—Robert W. B. Dickerson

[57] ABSTRACT

An assembly for permitting temperature measurements at a large number of locations within a vessel, which assembly has a spreader-reducer for compacting a significantly large number of thermocouple cables into a relatively small volume so as to permit passage through one or more vessel nozzles. The thermocouple cables each has a heat expansion portion as well as a seat, thereby permitting a series of horizontal arrays of thermocouple junctions positioned at different depths within the vessel.

7 Claims, 5 Drawing Sheets

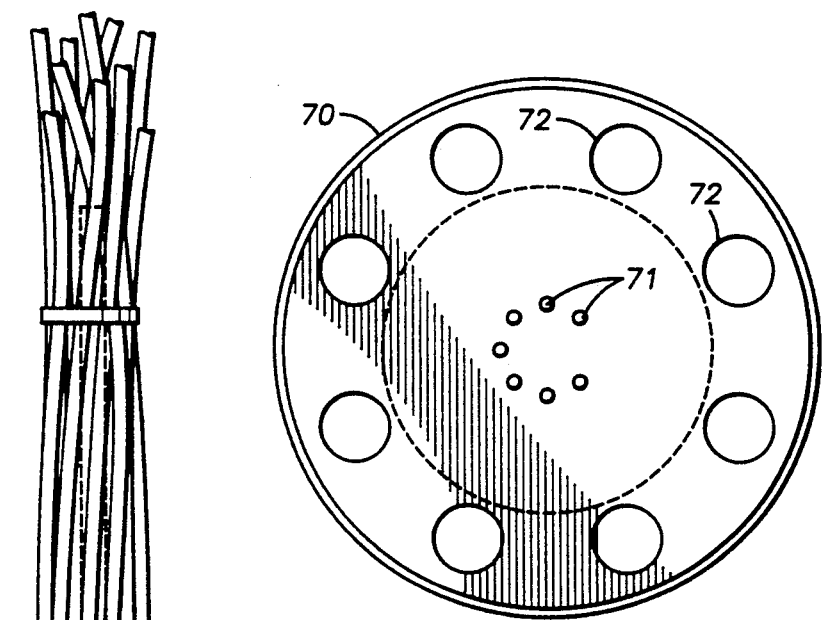
FIG. 6-A
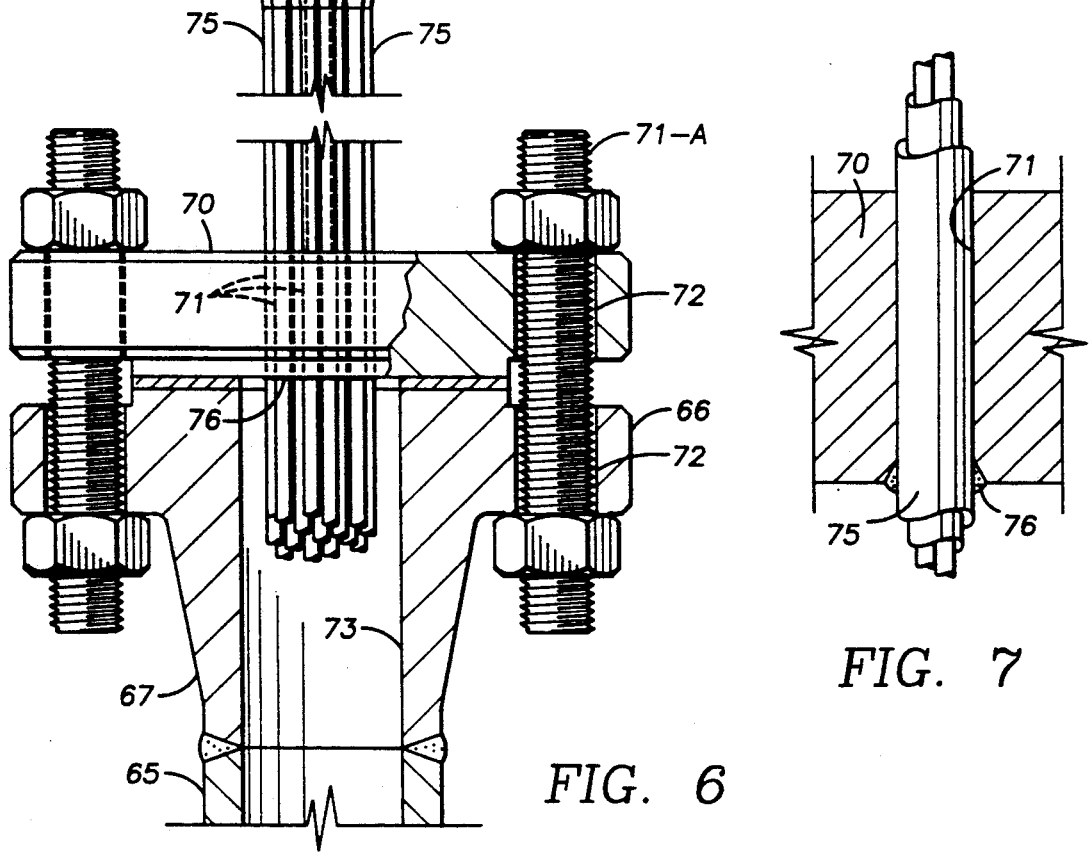
FIG. 6
FIG. 7

MULTIPOINT THERMOCOUPLE ASSEMBLY

BACKGROUND OF THE INVENTION

Many industrial processes and systems are temperature critical and require constant temperature monitoring. As an example, in the petrochemical industry catalytic reactors comprise pressure vessels containing catalyst material, and are intended to operate at high temperatures and pressure and accommodate a large product through put. Not only is the catalyst expensive, but reactor shut down or damage affects the quantity of finished product. The financial statement bottom line is generally a function of the quantity of such finished product. Various events can cause local temperature excursions, which may severely affect the reactor efficiency. Thus, measurements are necessary. Thermocouples have long been a vehicle for taking such measurements within a vessel. Examples of such prior methods are depicted in U.S. Pat. Nos. 3,262,502; 3,637,438; and 3,901,080. Since the mentioned excursions, or flare-ups, may occur throughout the volume of the vessel, the larger the number of measurement locations, the greater the opportunity to deal with a problem before it becomes critical. Attempts have been made to increase the number of thermocouple devices available for such measurements, as illustrated in U.S. Pat. No. 4,376,227. However, even that improvement did not provide for the kind of multi-level, horizontal temperature profile required and provided by this invention.

SUMMARY OF THE INVENTION

The principal purpose of this invention may be said to allow axial and radial distribution of temperature measuring devices in multiple catalyst beds in a pressure retaining vessel that has limited access through the vessel wall.

A large number of thermocouple cables pass to within a terminal box, which may be heat traced. Therein, the batch of cables is divided by a small number of spreader-reducer components, each said component being adapted to pass its respective group of cables through a nozzle to the interior of a reactor vessel. Within such vessel, each group of cables passes through a guide tube, and ultimately exits therefrom at a specific level. Each cable includes to heat expansion loop or section and a foot portion for securely resting the hot thermocouple junction on a catalyst tray, bed, or other fixed vessel structure. Each group of cables would normally be positioned at a different level from other groups. Within each group, a horizontal array may be formed, i.e., arcuately spaced from each other.

DESCRIPTION OF THE DRAWINGS

FIG. 6 is a partial, vertical axial section through the flanges of one of the expander-compactors;

FIG. 6-A is a plan view of blind flange 70;

FIG. 7 is a partial, broken, axial detail of flange 70, illustrating the welding of a thermocouple cable to a flange of the spreader-reducer;

DESCRIPTION OF A PREFERRED EMBODIMENT

Figure 2:
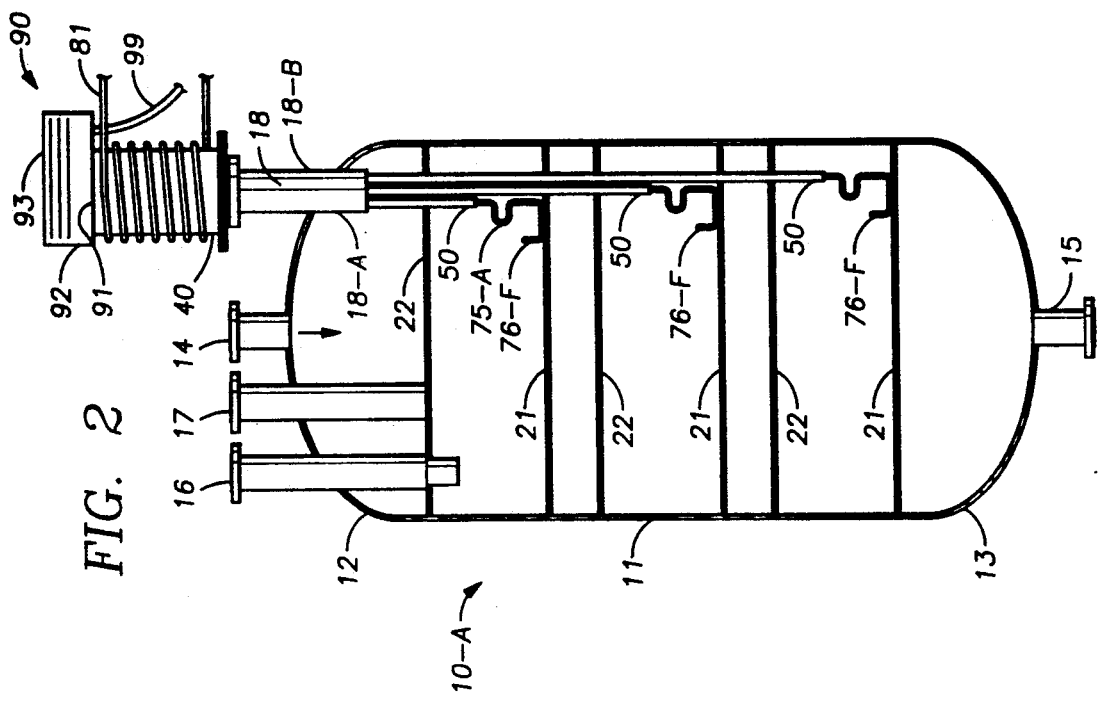
FIG. 2 is similar schematic, vertical section through a vessel, but illustrating the thermocouple arrangement of this invention.
Figure 1:
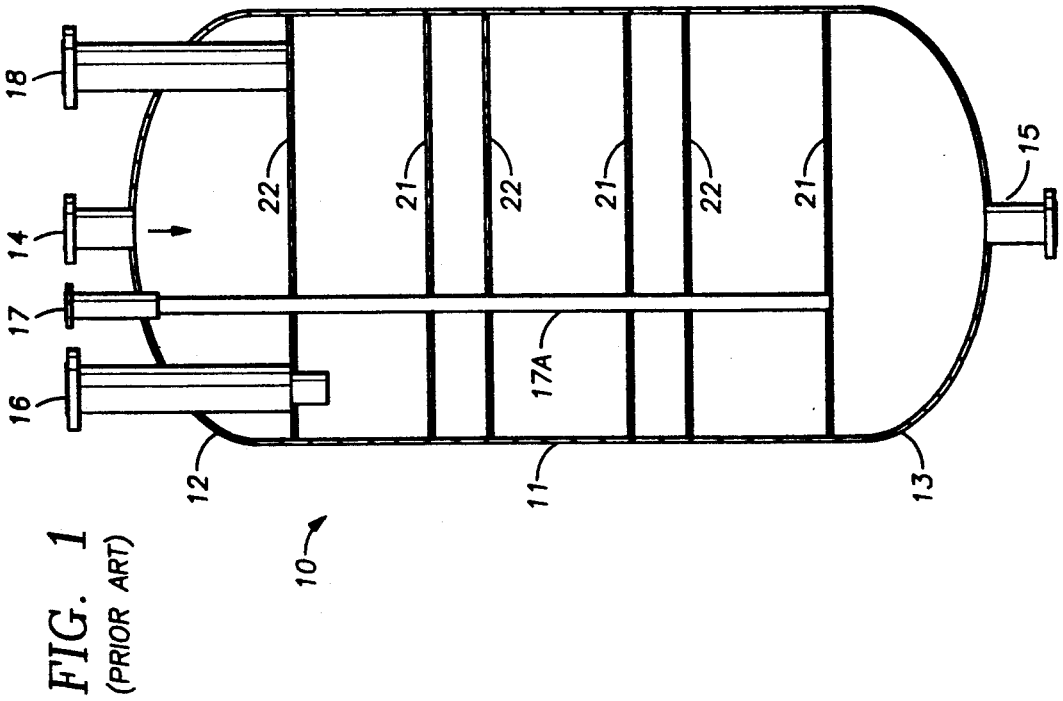
FIG. 1 is a somewhat schematic, vertical section through a vessel, depicting the present state of the art having a thermocouple well.

The pressure vessels 10, 10-A of FIGS. 1 and 2, may serve as reactors in a petrochemical process. Vessel 10 is illustrative of prior art usages of a thermocouple well, while vessel 10-A depicts the multi-point assemblies of this invention. The vessels each include a generally cylindrical body portion 11, with top and bottom, concave, covers 12 and 13. Material inlet and outlets, 14 and 15, respectively, are provided said covers. Such pressure vessels normally include a plurality of nozzles, such as 16, 17, and 18, for receipt of monitoring and/or control equipment. Nozzles such as 18 of vessel 10-A may receive multi-point thermocouple assemblies such as are described hereinafter. Nozzle 17 of vessel 10, is depicted as receiving and securing a thermocouple well 17-A used to receive and position a number of vertically dispersed thermocouples (not shown) in the manner described by said previously mentioned U.S. Pat. No. 4,376,227. Vessels, such as catalytic reactors, may include several beds of catalyst through which a fluid may flow, i.e., from inlet 14 to outlet 15, in the direction of the arrows. Such catalyst material may form beds, each bed including upper support tray 22 and lower, spaced distributor trays 21. The vessel construction, described hereinbefore, is not new. The trays may be suspended from, or otherwise joined to the interior wall of body portion 11 by means not depicted. Trays 21 and 22 would normally be meshed, or otherwise apertured so as to permit fluid flow therethrough. Protective thermocouple well 17-A, and thermocouple guide tubes described hereinafter, would pass through openings in such trays not specifically depicted.

Figure 3:
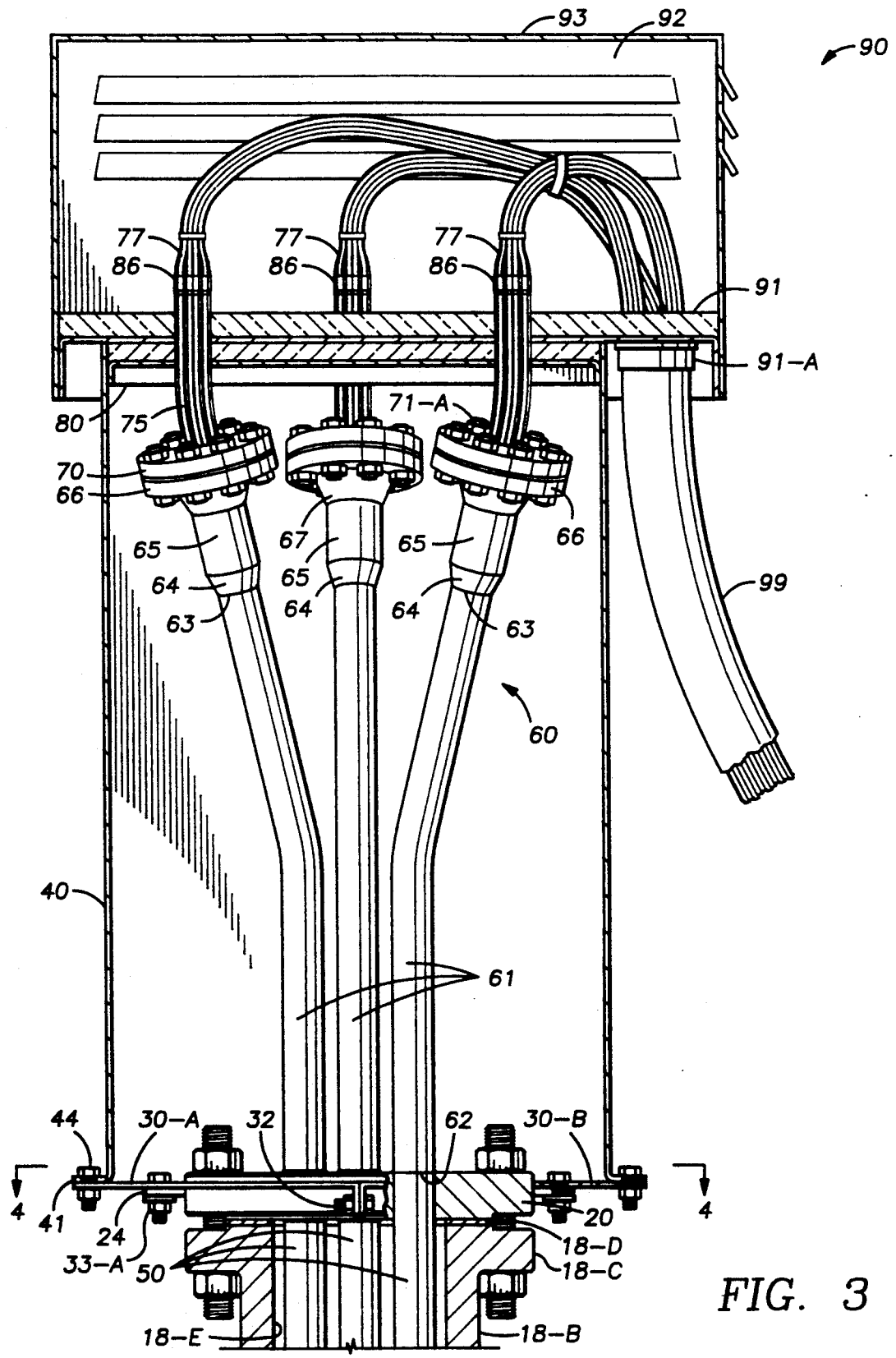
FIG. 3 is a vertical section through a vessel nozzle and attached terminal box, illustrating the cable-containing, spreader-reducer therein.
Figure 4:
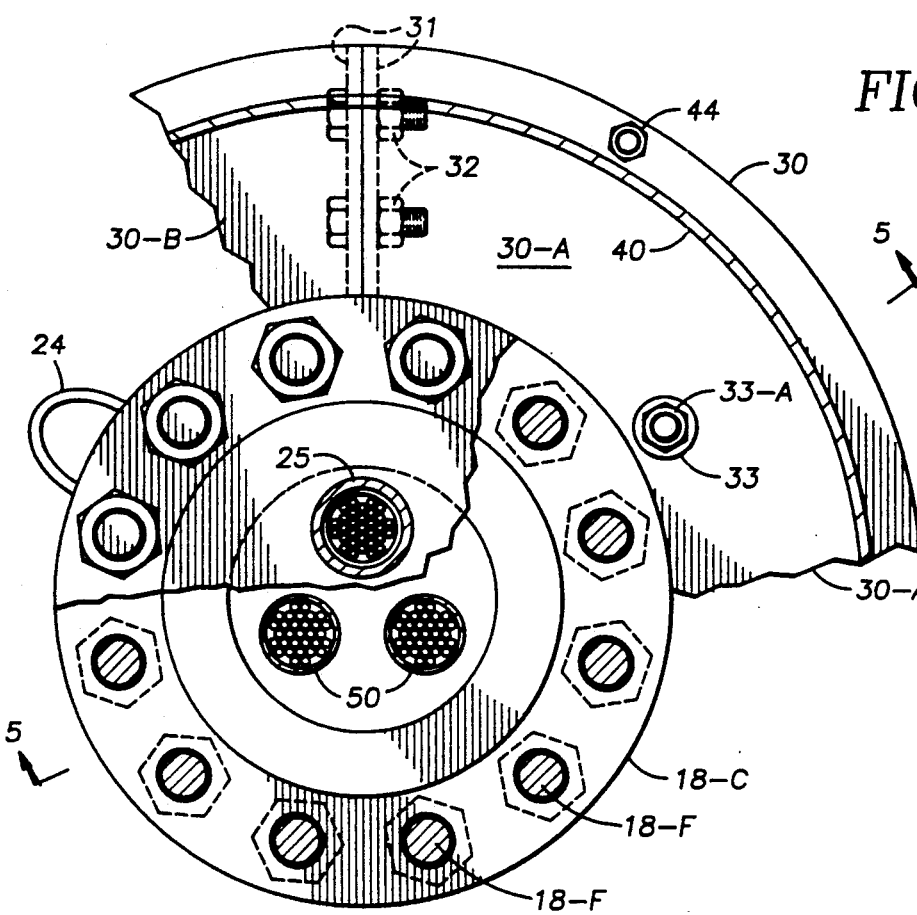
FIG. 4 is a broken horizontal section taken along lines 4—4 of FIG. 3.
Figure 5:
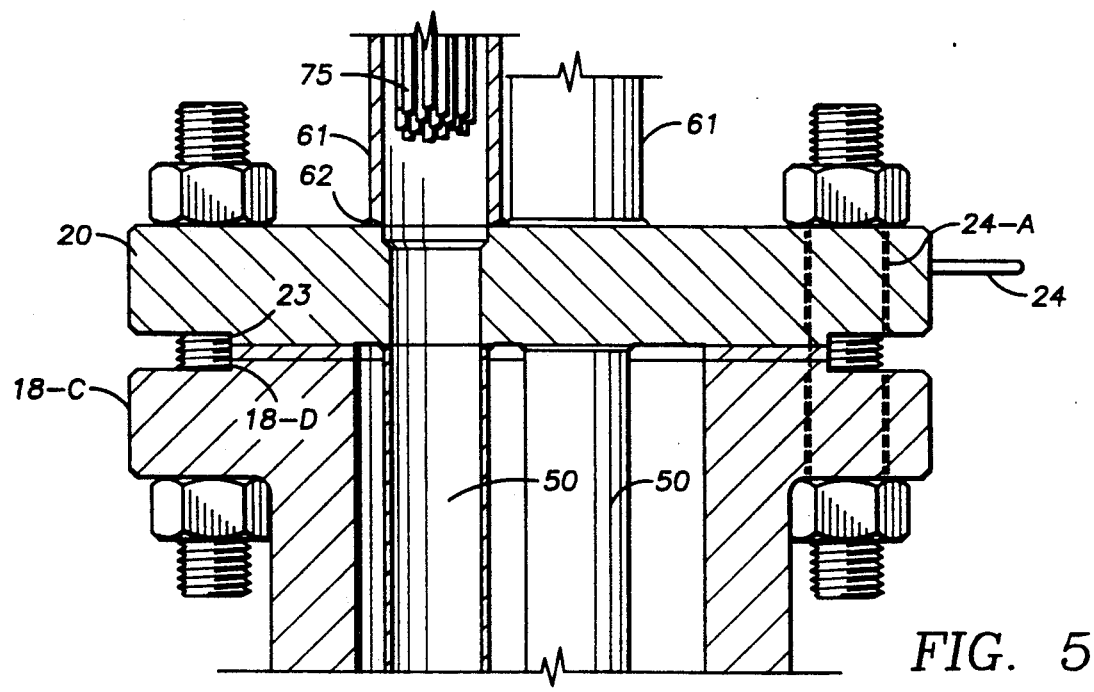
FIG. 5 is a sectional view taken along lines 5—5 of FIG. 4.

As mentioned, a certain number of nozzles will depend from vessels 10, 10-A. Selecting nozzle 18 of vessel 10-A as an example, it includes a skirt having portion 18-A extending within the vessel, and portion 18-B extending without. Depending from nozzle portion 18-B is centrally apertured, annular flange 18-C (see FIG. 3). Annular lip 18-D depends from nozzle flange 18-C, concentric with and radially exterior of the aperture 18-E therethrough. Flange 18-C includes a circle of bolt holes 18-F around its periphery (see FIG. 4).

The thermocouple assembly of this invention includes a mating flange to 18-C, namely annular flange 20. Annular raised face 23 depends from the undersurface of said flange. A circle of bolt holes 24-A, only partly depicted, extend through said flange 20, just radially interior of its periphery. These holes, along with their counterparts 18-F through flange 18-C, permit removably securing the thermocouple assembly to the vessel nozzle. Flange 20 includes a plurality of lifting lugs 24 secured to and spaced around its radially exterior wall. Further, a plurality of bored or otherwise formed passageways 25 extend axially through the flange 20, including through raised face 23.

A split collar 30 has similar halves 30-A and 30-B. Such halves may be secured by nut and bolt combinations 32 passing through aligned apertures through depending flanges 31 at opposite ends of each collar half. An interior set of bolt holes 33 permit securing said collar to lifting lugs 24 of flange 20, via nut-bolt combinations 33-A. Radially exterior thereto, a further set of bolt holes through said collar, permit securing the collar to annular flange 41 of a cylindrical can 40, subsequently described, via nut-bolt combinations 44.

Secured, as by welding, to raised face 23 of flange 20, peripherally of each passageway 25, is a guide tube 50, which may be of 1½" material. Such guide tubes 50 would each extend within vessel 10 to a depth just above a selected bed-forming tray 21, as described hereinafter. At the opposite face of flange 20, ends 62 of guide tubes or wells 61 are also welded or otherwise secured to flange 20, peripherally of each passageway 25. These members 61 may be 2" SCH 160 pipe, for example. Thus, the I.D. of each tube or well 61 is in communication with its respective passageway 25 through flange 20 and with the I.D. of aligned guide tube 50.

Figure 9:
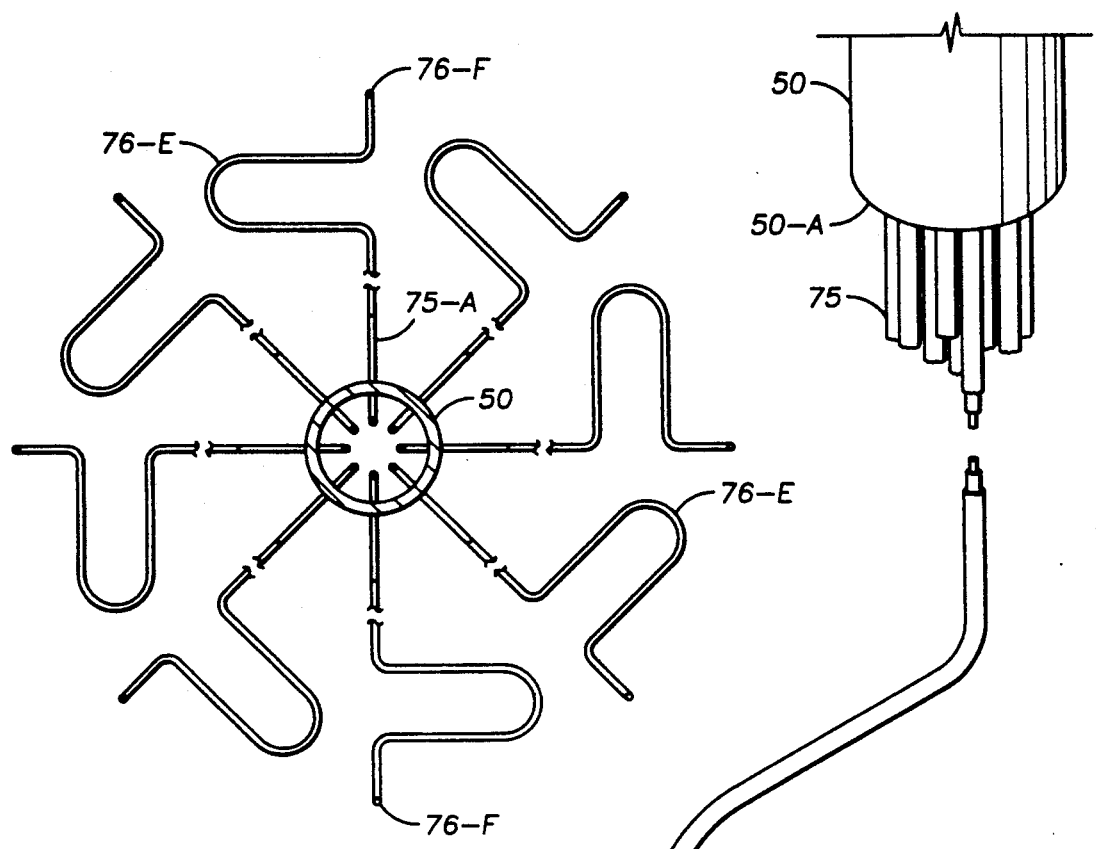
FIG. 9 is a section, illustrating the radial distribution of thermocouple cables at a discreet depth, taken along lines 9—9 of FIG. 8.
Figure 8:
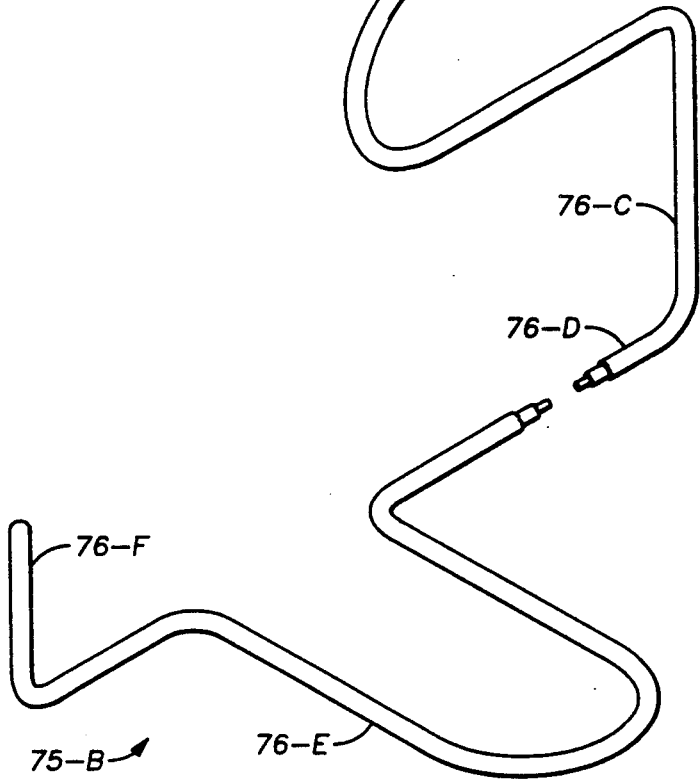
FIG. 8 is a broken perspective of a thermocouple cable expansion section and foot.

It will be seen that each member 61 forms a component of a spreader-reducer, as generally illustrated at 60. The spreader-reducer includes a plurality of said tubes 61, each joined at one end to flange 20. The other tube end 63 may be welded to reducer section 64. Opposite tube end 63, said reducer section 64 would be linked to pipe section 65, and such pipe section to the neck 67 of weld-neck flange 66. Flange 66 would be secured to a raised face of blind flange member 70 by bolts 71-A passing through aligned circles of bolt passageways 72. Whereas flange member 66 includes an axial bore 73 (preferably 3") therethrough, flange member 70 has a plurality of smaller passageways 71, preferably in a "C" configuration. Such a "C" arrangement allows the welds to be made on the process side of the flange, as well as permits a large number of welds in a confined area. Each such passageway accommodates and is welded to a single thermocouple cable, or sheathed thermocouple 75, such as a 5/16" O.D. thermocouple being welded at 76. Each thermocouple cable includes a pair of wires, of dissimilar material, insulatingly imbedded within a jacket or sheath. At one end, flexible lead wire 77 forms an extension of the pair of leads of each thermocouple cable 75. The actual leads of such flexible wire is joined to the leads of each thermocouple cable 75, by a typical transition housing 86. Each said cable 75 passes through flanges 70 and 66, through expander-reducer 60, guide tube 61 and tube or well 50, to exit at the bottom of said last mentioned member. Each such tube or well 50 would terminate near a tray 21, and would carry a number of sheathed thermocouple or cables, which would each extend beyond tip 50-A of each tube 50. The geometry of the thermocouple cable 75, after they exit wells or tubes 50, is best illustrated by FIGS. 8 and 9. Each cable would normally include an expansion loop or portion 75-A, primarily to allow adjustment to accommodate significant heat variations. A foot is formed at the lower end of each thermocouple cable 75, opposite its associated tube end 50-A, and is generally illustrated at 75-B. Each foot would include a stem 76-C downwardly depending from loop 75-A, horizontal leg 76-D, extending from said stem, said leg being interrupted by U-shaped extension 76-E. Finally, said foot terminates in upwardly extending toe 76-F, which generally includes the hot junction of the thermocouple. It should be recalled that there would be several thermocouple cables 75 (perhaps 13) passing through each guide tube or well 50. These would be espallieried, i.e., radially forming an arcuate, horizontal path around the axis of such well 50, as exemplified by FIG. 9. If desired, the individual lengths of legs 76-D and/or toes 76-F may vary, permitting point temperature measurements in whatever array is desired. As also mentioned, each guide tube would terminate intermediate its associated trays 21 and 22 so that the associated cable foot rests on its associated distributor tray 21, permitting the measurement of temperatures substantially throughout vessel 10. Such a Christmas tree arrangement, including expander-reducers 60, allow bundles of guide tubes 50, each capable of containing a plurality of sheathed thermocouples 75, to enter vessel 10-A through a single nozzle.

It will further be seen that spreader-expanders 60, flanges 66 and 70, and the exiting sheathed thermocouple 75, are positioned within a volume defined by flange 20, can 40, and an insulated ceiling 80, through which the separate bundles of sheathed thermocouples would pass. Should heat tracing be desired, electrical resistance heater 81 wrapped around can 40, and surrounded by an insulation blanket (not shown), would retain desired temperatures interior of can 40. A source of power, not illustrated, would activate heater 81. A similar method, not illustrated, would require providing such resistance heaters, and surrounding insulation, around each bundle of sheathed thermocouples. Such heat tracing, like the weld location on the process side of flange 20, is desirable from a corrosion-resistant point of view.

A terminal box 90, includes an insulated floor 91, ventilated vertical walls 92 and cover 93. The separate bundles of sheathed thermocouples exiting can 40 would pass through said floor 91 to enter the box. The said thermocouples, actually the collection of flexible lead wires 77, would then either be individually connected to a terminal strip (not shown), or pass to a threaded connector 91-A. A user may threadedly join thereto a section of protective casing or pipe 99 through which said wires 77 may be directed to a distant terminal strip or box from whence appropriate electronic telemetering equipment may provide temperature readouts from the locations of the various hot junctions.

Since flanges 70, 66 and 18-C, 20, are sealingly engaged, and thermocouples 75 are welded to flange 70, relative motion, caused by thermal expansion, between the sheathed thermocouples and concentric components is accommodated, as well as between guide tubes 50 and the vessel's trays.

It should readily be apparent that, although only a single embodiment has been depicted, numerous modifications would be possible by one skilled in the art without departing from the spirit of the invention, the scope of which is limited only by the following claims.

We claim:

1. In a thermocouple assembly which includes a thermocouple cable having a hot junction at one end and which cable is insertiable through a nozzle into a pressure vessel, an improved junction positioning device comprising:
   a planar portion of said thermocouple cable being linked to and proximate said one thermocouple cable end, said end, and its said hot junction, being elevated, relative to said planar cable portion when said portion is positioned in a relatively horizontal attitude; and said thermocouple cable also having heat expansion-accommodating portion linked to said planar portion away from said cable end's hot junction.

2. The assembly of claim 1 wherein said planar portion includes a u-shaped extension of said thermocouple cable and said one end extends substantially vertically therefrom.

3. The assembly of claim 1 wherein said planar portion is adapted to rest on a planar member carried by said pressure vessel.

4. In an assembly for permitting temperature measurement at a plurality of locations within a pressure vessel, said vessel having a plurality of substantially parallel, planar support members therein, said assembly comprising:

tubular, thermocouple-cable guide means adapted to convey a plurality of thermocouple cables within said vessel; a plurality of thermocouple cables, each extending through said guide means and into said vessel proximate one of said vessel-3 s planar support members, each said cable also comprising;

a hot junction at one end, a planar cable portion being linked to and proximate to its said cable's one end, said end and its said hot junction being elevated relative to said planar cable portion when said planar cable portion is in a relatively horizontal attitude, and a heat expansion-accommodating portion linked to said planar cable portion away from said cable end's hot junction.

5. The assembly of claim 4 wherein said thermocouple-cable guide means includes a plurality of guide tubes at least one of which encompasses at least some of said plurality of thermocouple cables which are arranged in arcuate formation with the planar portion of each of said at least some of said plurality of cables being positioned on the same one of said vessel's planar support members.

6. The assembly of claim 4 wherein at least some of said vessel's planar support members are positioned at different depths internally of said vessel, and each of at least two of said vessel's planar support members, so positioned at different depths, receives one of said thermocouple cable's planar portions.

7. The assembly of claim 5 wherein said wherein at least some of said vessel's planar support members are positioned at different depths internally of said vessel, and each of at least two of said vessel's planar support members, so positioned at different depths, receives one of said thermocouple cable's planar portions.

* * * * *